UNITED STATES PATENT OFFICE.

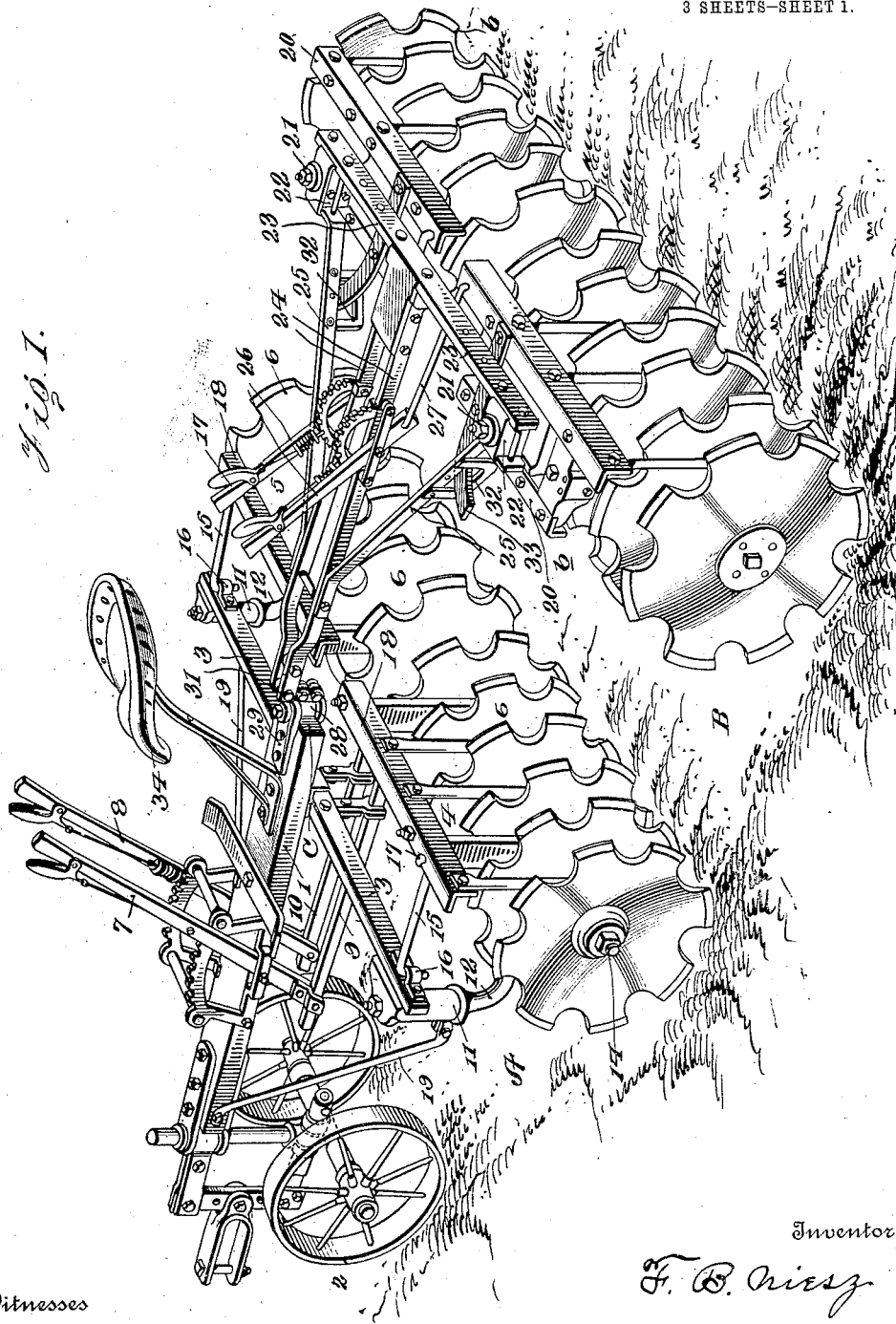

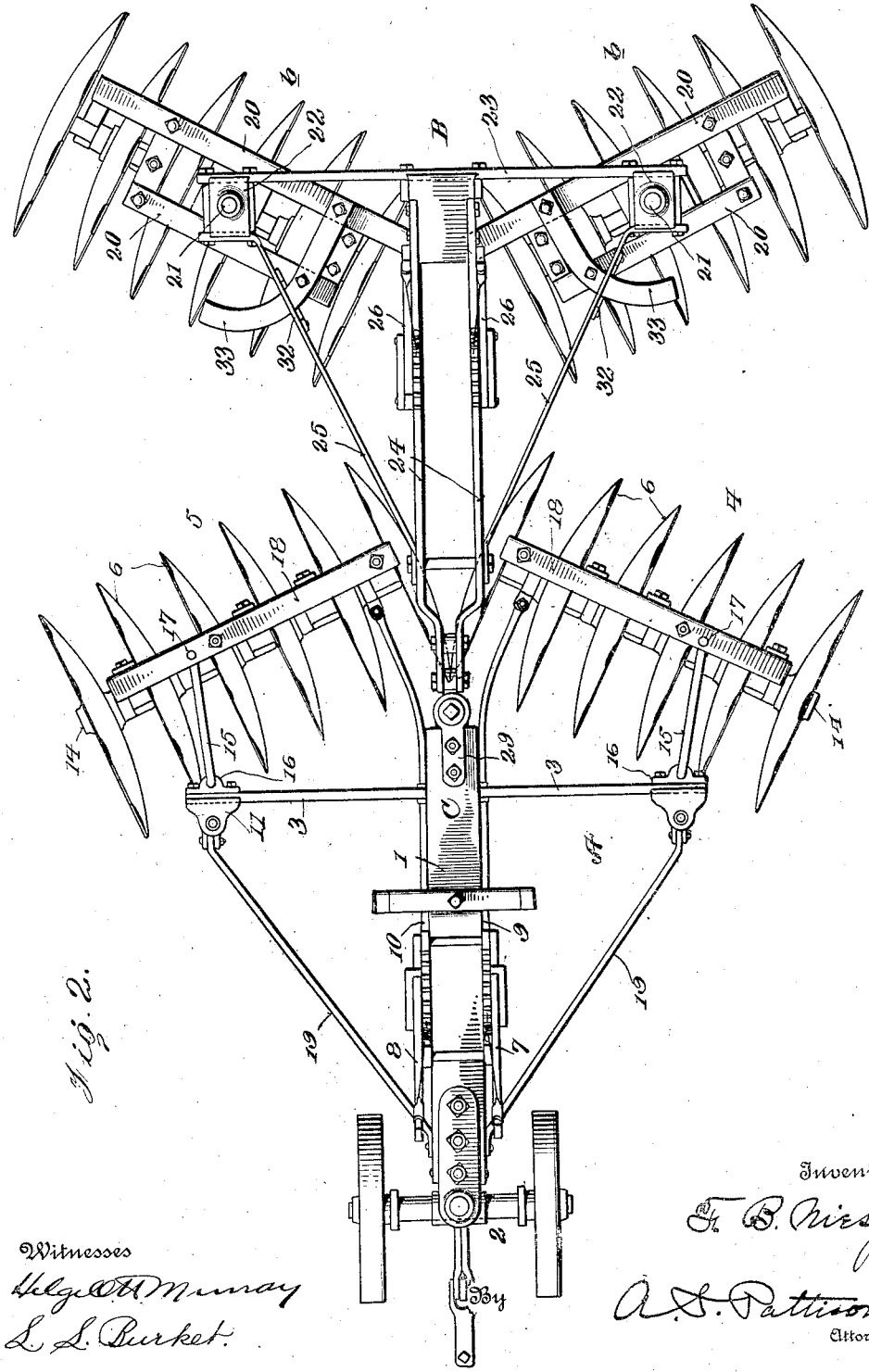

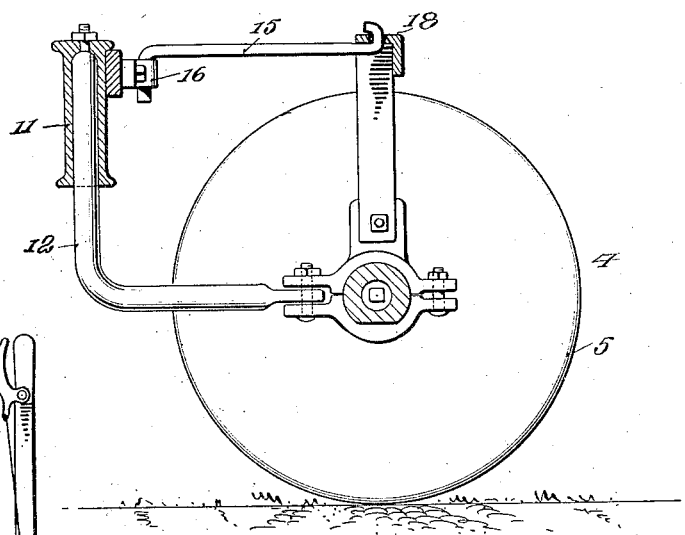
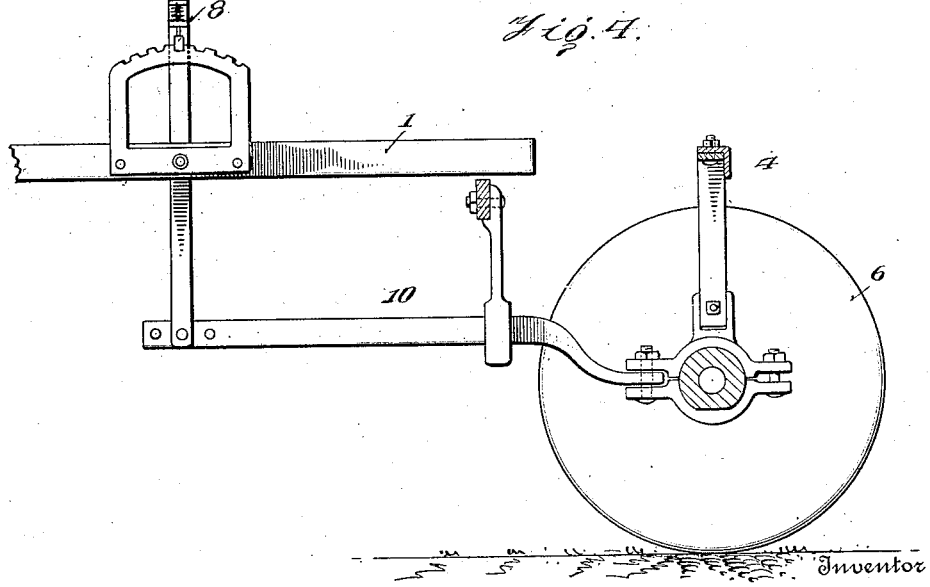

FRANK B. NIESZ, OF CANTON, OHIO.

DOUBLE DISK HARROW.

1,113,241.      Specification of Letters Patent.      Patented Oct. 13, 1914.

Application filed August 11, 1910. Serial No. 576,708.

*To all whom it may concern:*

Be it known that I, FRANK B. NIESZ, a citizen of the United States, residing at Canton, in the county of Stark and State of Ohio, have invented certain new and useful Improvements in Double Disk Harrows, of which the following is a specification, reference being had therein to the accompanying drawing.

My invention relates to improvements in a double disk harrow, which comprises a front section having two pivoted disk shafts, a rear section having two pivoted disk shafts, and a longitudinally arranged reach or draft bar which connects the rear section to the front section.

One object of the present improvement is to provide a universal connection between the front end of the draft or reach bar and the first section, whereby the two sections have independent horizontal and vertical movements which permit each section to freely and independently swing up and down to follow certain inequalities of the surface, and furthermore serves as a swivel to permit the harrow to freely make short turns at the ends of the rows.

Another object of this improvement is to provide the vertically pivoted rear disk or shaft sections and the rear portion of the draft bar respectively with sliding loops and tongues to relieve the lateral strain on the vertical pivots, due to the rearward rocking tendency of the rear pivoted disk sections, which rear rocking tendency is caused by the draft engagement of the disk with the soil.

The present improvement involves other novel features and objects, which will be specifically described and pointed out hereinafter.

In the accompanying drawings—Figure 1 is a perspective view of my improved double disk harrow. Fig. 2 is a top plan view of my improved harrow. Fig. 3 is a vertical section through the front disk section 4, at a point just outside of the bars 12 and 15. Fig. 4 is a vertical section through the center of the front section, showing the adjusting mechanism.

Referring now to the drawings, A, is the front harrow section, and B, the rear section. The front section comprises a longitudinal draft bar 1, which carries at its front end a suitable truck, and since this truck does not involve the present improvement, it will not be specifically described. Any suitable form of truck may be used. Attached to the rear end of the draft bar 1, is a transverse draft bar 3.

Two forward disk sections 4 and 5, carry in any suitable manner harrow disks 6. The outer ends of these disk frames 4 and 5 are vertically pivoted to the outer ends of the transverse draft bar 3, which permits their inner ends to be swung backward and forward to set them at any desired angle, as shown in Fig. 2, or in a line as shown in Fig. 1. This adjustment is accomplished through the medium of levers 7 and 8, which are connected with the inner swinging ends of the disk sections by means of links 9 and 10.

The form of pivotal connection here shown between the outer ends of the disk sections 4 and 5 and the transverse draft bar 3, comprises vertical sockets 11 carried at the outer ends of the transverse draft bar 3; the curved members 12 which have their upper and forward ends journaled in the sockets and their lower and rear ends connected with the disk shafts 14; and the rods 15 which have their forward ends vertically journaled in the sockets 16 and their rear ends bent and swiveled at the points 17 in the top bars 18 of the front pivoted harrow sections. Brace rods 19 connect the lower ends of the sockets 11 with the longitudinal draft bar 1.

Referring now to the rear harrow section B, it comprises the two disk sections *b*, *b*, each section having top horizontal bars 20, which have vertical pivotal bolts 21, which are vertically journaled in the blocks 22. These blocks are carried by the ends of the rear cross-end 23 of the rear harrow section draft bar 24. Brace bars 25 form a part of this draft bar, and have their forward ends connected to the front end of the central portion of the draft bar, and their rear ends are connected to the bearing blocks 22. As shown the bearing blocks 22 and the pivotal bolts 21 are at the centers of the disk sections. These rear disk sections are adjusted to any desired angle, as shown in Fig. 2, or in a line as shown in Fig. 1, by means of the levers 26 and links 27.

One of the present improvements pertains to the manner of connecting the front end of the draft bar 24 to the front harrow section. The improvement involves any suitable universal form of connection C, or any form of connection which will permit the front and rear harrow sections to have independent horizontal and vertically swinging movements, making a connection which enables the sections to freely and independently swing up and down to follow certain inequalities of the soil, and to turn short corners at the ends of the harrowed rows. As here shown, this connection comprises a vertical head 28, which is vertically pivotally connected with the member 29, at the rear end of the front draft bar 1. This head 28 is provided with horizontal openings 30, through which and the front end of the rear draft bar 24, a horizontal pivotal bolt 31 passes. The vertically pivoted head 28 permits an independent horizontal swinging movement, and the horizontal pivotal bolt 31 permits an independent vertical movement of the front and rear harrow sections. I do not limit myself to this kind of joint. Any form of joint which is intended to, and does permit an independent horizontal and vertical movement of the front and rear harrow sections, will come within the broad purview of this part of my improvement.

Attention is directed to the plurality of horizontal openings 30, the object of which is to accomplish a vertical adjustment of the point of connection between the draft bar 24 and the front harrow section.

It will be noticed that the draft of the rear disk sections $b$, $b$, is accomplished principally from their top through the medium of the vertical pivotal bolts 21 and journal blocks 22, so that the rear rocking tendency of the rear disk sections by reason of the draft thereof with the soil comes on these bolts and blocks. To largely relieve the strain of this rear draft upon the blocks and bolts, I arrange a sliding loop and tongue connection between the tops of the disk sections and the rear draft bar. This arrangement comprises loops 32, which depend from the brace portions 25 of the rear draft bar 24, and tongues 33, which project forward from the tops of the disk sections, and slide through the loops. These tongues are located below the rear bar 23 of the draft bar, and the loop and tongue engage at a point in front of the disk sections, which provides a considerable leverage as between the tops of the disk sections, and the points of engagement of the loops and tongues. The tongues and loops will engage at any angular adjustment of the disk sections, and will receive the rear rocking strain due to the rear draft caused by the engagement of the disk with the soil.

In a harrow of this type the heavy cutting work is performed by the front section by reason of it working upon the uncut soil, whereas the work of the rear section is lighter because it works on the soil that has been previously worked by the front section. In order to cause the front section to cut into the unworked soil, means are provided for making it heavier than the rear section, thus providing a corresponding heavy front section, and a light rear section. This part of my improvement comprises having a front and rear section which are capable of independent vertical movement, and having means for making the front one heavier. The idea of this improvement may be accomplished in many ways, the manner here shown consists in providing the front section with the driver's seat 34, by means of which the driver weights the front section, thus making a corresponding heavy front and light rear section.

It will also be observed, that the front disk sections are pivoted at their outer portions, and substantially in the line of draft, whereas the rear disk sections are pivoted above their tops and at a point substantially equi-distant between the ends of their tops.

Having thus described my invention, what I claim and desire to secure by Letters Patent is:

1. In a double disk harrow, the combination with a front harrow section having horizontally swinging disk sections, of a rear harrow section having a central longitudinally extending draft bar, the front end of the draft bar flexibly connected with the front harrow section, rear disk-sections having vertical pivotal connections between the tops of the sections and the said draft bar, adjusting members connecting the rear sections and the draft bar; the draft bar and disk-sections having respectively loops and tongues separate and independent of the adjusting members, the tongues slidably passing through and engaging the loops.

2. In a double disk harrow, the combination with a front harrow section having horizontally swinging disk sections, of a rear harrow section having a central longitudinally extending draft bar, the front end of the draft bar flexibly connected with the front harrow section, rear disk-sections having vertical pivotal connections between the tops of the section and the said draft bar, adjusting members connecting the rear sections and the draft bar, the draft bar and disk sections having respectively loops and tongues separate and independent of the adjusting members slidably passing through and engaging the loops.

In testimony whereof I hereunto affix my signature in the presence of two witnesses.

FRANK B. NIESZ.

Witnesses:
H. N. McABEE,
RAY L. EBY.